United States Patent [19]

Donald

[11] 3,879,394

[45] Apr. 22, 1975

[54] 2,3-DICHLORO-5,6-DICYANOPYRAZINE AND DERIVATIVES

[75] Inventor: Dennis Scott Donald, Mendenhall, Pa.

[73] Assignee: E. I. du Pont de Nemours and Company, Wilmington, Del.

[22] Filed: Sept. 25, 1973

[21] Appl. No.: 400,505

[52] U.S. Cl. .............. 260/250 BN; 8/1 D; 8/1 W; 8/77; 117/33.5 T; 252/301.2 W
[51] Int. Cl. ............................................. C07d 51/76
[58] Field of Search .............. 260/250 RB, 250 BN

[56] References Cited
UNITED STATES PATENTS

| | | | |
|---|---|---|---|
| 3,017,412 | 1/1962 | Daglish et al. | 260/250 RBN |
| 3,625,944 | 12/1971 | Grabowski et al. | 260/250 RBN |
| 3,763,161 | 10/1973 | Hartter | 260/250 RBN |
| 3,814,757 | 6/1974 | Donald | 260/250 RBN |

FOREIGN PATENTS OR APPLICATIONS 2,216,925   10/1972   Germany ........................ 260/250

OTHER PUBLICATIONS

Theilheimer, "Synthetic Methods of Organic Chemistry," pp. 264–265, (1964).
Klaus et al., Chemical Abstracts, 78:71364t, (1973), of Tetrahedron Letters, No. 47, pp. 4771–4774, (1972).

*Primary Examiner*—Alton D. Rollins
*Assistant Examiner*—Ralph D. McCloud

[57] ABSTRACT

Certain amino derivatives of 2,3-dichloro-5,6-dicyanopyrazine are useful fluorescing agents.

3 Claims, No Drawings

2,3-DICHLORO-5,6-DICYANOPYRAZINE AND DERIVATIVES

BACKGROUND OF THE INVENTION

1. Field of the Invention

This invention relates to novel pyrazine derivatives and to methods of making the same.

2. Description of the Prior Art

Per- compounds have been known for a number of years. For example, tetrafluoroethylene and other perhalogenated compounds are widely known and used in polymers, stable fluids and numerous other applications. Percyano and polycyano compounds, e.g., tetracyanoethylene, are also known and their chemistry reviewed in Chapter 9 in Z. Rappaport, "The Chemistry of the Cyano Group", John Wiley and Sons, Interscience Publishers, 1970. These polycyano compounds frequently undergo nucleophilic displacement reactions unique to compounds highly substituted by cyano groups. No art appears to exist, however, disclosing the compounds of the present invention.

DESCRIPTION OF THE INVENTION

The invention comprises a compound of the general formula:

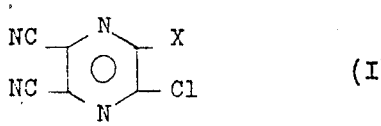

(I)

wherein X is $NH_2$, NHR and NRR', in which R and R', alike or different, are alkyl of 1 to 6 carbon atoms or alkenyl of 3 to 6 carbon atoms with the proviso that an unsaturated carbon of the alkenyl group is not directly attached to nitrogen.

The invention also comprises an improved process for the preparation of the 2,3-dichloro-5,6-dicyanopyrazine which is used as the starting material for making the aforesaid compounds. It is prepared by reaction of the known compound, 1,4,5,6-tetrahydro-5,6-dioxo-2,3-pyrazinedicarbonitrile, with thionyl chloride as shown:

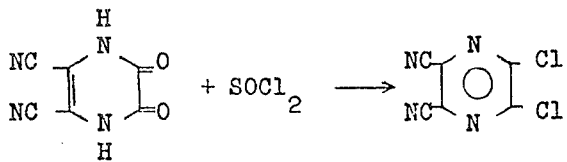

The reaction is ordinarily carried out using excess thionyl chloride as reaction medium. Other chlorinating agents, e.g., phosphorus oxychloride, phosphorus pentachloride, and mixtures of these may be used, but thionyl chloride is preferred. The use of a tertiary amine as a base to remove the by-product hydrogen chloride from the reaction mixture can be employed. Suitable such bases include pyridine, collidine, N,N-dimethylaniline, and other tertiary aromatic amines.

It is preferred to carry out the reaction in the presence of a catalytic amount of dimethylformamide or dimethylacetamide to give an improved yield of product. The quantity of the catalytic amide should be at least 0.02 mole per mole of 1,4,5,6-tetrahydro-5,6-dioxo-2,3-pyrazinedicarbonitrile, preferably 0.1 to 0.5 mole per mole. Larger amounts can be used if desired.

The reaction temperature and pressure are not critical, but it is convenient to carry out the reaction at atmospheric pressure and temperatures of 25° up to the reflux temperature of the chlorinating reagent used. Thus, in a preferred embodiment with thionyl chloride, temperatures of 25°-79° are employed.

Reaction times range widely from about one to several hours depending upon the reaction temperature employed. Times of 1-24 hours are preferred.

The amino-substituted pyrazines of the invention are prepared by reaction of 2,3-dichloro-5,6-dicyanopyrazine with the corresponding substituted amines, as shown:

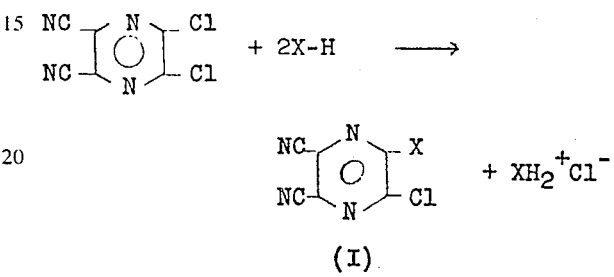

wherein X has the values set out above.

Amines react readily with the dichloro-substituted pyrazine at about room temperature or below, and it is preferred to employ temperatures of −75° to 30°C at atmospheric pressure. Reaction times for complete reaction range from a few minutes to several hours depending upon the reaction temperature and the particular amine employed.

The reaction is normally carried out in a nonprotic polar solvent. Examples of suitable solvents include tetrahydrofuran, acetone, acetonitrile, dimethylsulfoxide, 2-methoxyethyl ether (diglyme), 1,2-dimethoxyethane (glyme), and ethyl acetate. It is preferred to employ tetrahydrofuran as solvent.

Two moles of amine reactant are required for each mole of 2,3-dichloro-5,6-dicyanopyrazine to effect replacement of one of the chlorine atoms since the second mole reacts with the liberated HCl as shown in the equation above. A slight excess of amine over that required may be employed, i.e., about 2.1 moles of amine per mole of starting pyrazine.

SPECIFIC EMBODIMENTS OF THE INVENTION

The following examples illustrate the invention and all parts are by weight and all temperatures are in degrees Centigrade unless stated otherwise.

EXAMPLE 1

2,3-Dichloro-5,6-dicyanopyrazine (1)

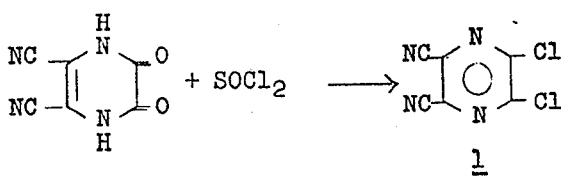

To a mixture of 4.80 g. (30 mmoles) of 1,4,5,6-tetrahydro-5,6-dioxo-2,3-pyrazinedicarbonitrile, prepared by the method of Bredereck and Schmötzer, Ann., 600. 95 (1956), in 100 ml of thionyl chloride was added slowly at 25° 4.74 g (60 mmoles) of pyridine.

The mixture was heated under reflux for 18 hours, and the starting material was completely dissolved after this time. Excess thionyl chloride was distilled at reduced pressure, and the residual dark, viscous oil was dissolved in methylene chloride. This solution was successively extracted with water, aqueous sodium bicarbonate solution and finally with water. The organic layer was dried and the solvent removed to leave 2,3-dichloro-5,6-dicyanopyrazine as a yellow solid. The product was purified by recrystallization from chloroform to give 1.37 g (23.4%) of purified product as white prisms, mp 179°–180°. Alternatively, 2,3-dichloro-5,6-dicyanopyrazine may be purified by sublimation.

IR: 2240 cm$^{-1}$ (C≡N); 1505 cm$^{-1}$ (C=C/C=N).
UV: $\lambda_{max}^{CH_3CN}$ 304 m$\mu$ ($\epsilon$ 8300); 253 m$\mu$ ($\epsilon$ 11,700); 211 m$\mu$ ($\epsilon$ 26,900).
Anal. Calcd for $C_6N_4Cl_2$:  C, 36.20;  N, 28.19;  Cl, 35.61
Found:  C, 35.88;  N, 28.06;  Cl, 35.04
        36.08    28.09    35.09.

EXAMPLE 2

2,3-Dichloro-5,6-dicyanopyrazine (1)

A mechanically stirred slurry consisting of 81.0 g (0.50 mol) of 1,4,5,6-tetrahydro-5,6-dioxo-2,3-pyrazinedicarbonitrile, 8.0 ml of dimethylformamide and 1600 ml of thionyl chloride was heated under a nitrogen atmosphere and gas evolution began at ca. 62°. After 3.5 hours the solid had dissolved and the temperature had risen to 70°. After cooling to room temperature a Dry Ice/acetone bath was applied until the temperature of the reaction medium was −65°. The crystals which formed were collected by rapid filtration of the cold slurry under nitrogen. The solid was washed twice with 150-ml portions of cold diethyl ether and air-dried to give 69.9 g (70%) of 2,3-dichloro-5,6-dicyanopyrazine. Recrystallization of the product from 600 ml of chloroform with carbon treatment gave 51.4 g of purified product.

EXAMPLE 3

2-Amino-3-chloro-5,6-dicyanopyrazine (2)

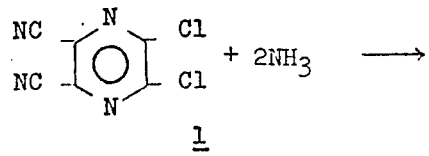

A total of 55 mg of 2,3-dichloro-5,6-dicyanopyrazine was treated with liquid ammonia by condensing the ammonia directly onto the solid to give a yellow solution. Evaporation of the ammonia left a red solid. The solid was dissolved in acetone, filtered to remove insoluble ammonium chloride, and the acetone evaporated. The residue was crystallized from acetone-water to give partially purified 2-amino-3-chloro-5,6-dicyanopyrazine, mp 185° (with decomposition).

High Resolution Mass Spectrum: molecular ion, $C_6H_2N_5Cl$, calculated m/e 178.9999; measured m/e, 178.9980.

Additional analytical data were obtained on another sample of the product, prepared as described in Example 4, mp 206.0°–208.0°.

IR (KBr):  2.92 $\mu$, 3.01 $\mu$, 3.12 $\mu$ (—NH$_2$ and/or —NH); 4.47 $\mu$ (—C≡N); 6.17 $\mu$, 6.48 $\mu$, 6.68 $\mu$ (—NH$_2$, —NH, C=N and/or C=C).
UV $\lambda_{max}^{EtOH}$: 343 m$\mu$ ($\epsilon$ = 5980); 289 m$\mu$ ($\epsilon$ = 20,100).
Anal. Calcd for $C_6H_2N_5Cl$:
  C, 40.01;  H, 1.11;  N, 39.00;  Cl, 19.78
Found:  C, 40.05;  H, 1.27;  N, 38.81;  Cl, 19.46;

EXAMPLE 4

2-Amino-3-chloro-5,6-dicyanopyrazine (2)

A solution of 5.00 g (25.1 mmoles) of 2,3-dichloro-5,6-dicyanopyrazine (1) in 50 ml of anhydrous tetrahydrofuran was cooled to −70° in a Dry Ice-acetone bath. Anhydrous ammonia was passed slowly over the rapidly stirred solution for 5 minutes during which time the temperature rose to −55° and yellow microcrystals formed. The still-cold reaction mixture was poured into 300 ml of water to precipitate, after water wash and air-drying, 3.45 g (81%) of nearly pure 2-amino-3-chloro-5,6-dicyanopyrazine (2) as a yellow powder. Careful acidification of the cold mother liquor to pH 2 and evaporation to dryness on a rotary evaporator gave 0.60 g of slightly less pure product. Two recrystallizations from tetrahydrofuran/chloroform gave the purified product as pale yellow crystals, mp 206.0°–208.0°.

EXAMPLE 5

2-Allylamino-3-chloro-5,6-dicyanopyrazine (3)

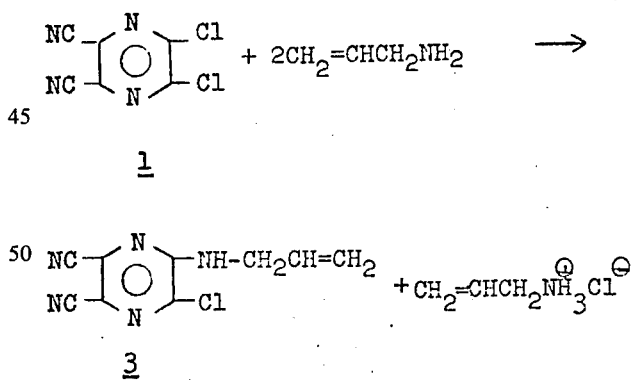

A solution of 5.00 g (25.1 mmoles) of 2,3-dichloro-5,6-dicyanopyrazine in 50 ml of anhydrous tetrahydrofuran was cooled to −70° in a Dry Ice/acetone bath and a solution of 3.00 g (52.6 mmoles) of allylamine in 20 ml of anhydrous tetrahydrofuran was added dropwise over a period of 30 minutes. After an additional 15 minutes the cold reaction mixture was poured into 700 ml of water giving an oil which crystallized to a yellow solid. The solid was filtered, washed with water and air-dried to give 5.05 g of yellow solid 2-allylamino-3-chloro-5,6-dicyanopyrazine, mp 111°–113°. The product was purified by recrystallization twice from benzene/petroleum ether to give the purified product as pale yellow crystals, mp 113°–114°.

IR (KBr): 2.98 μ (—NH); 3.23 μ (=CH); 3.42 μ (saturated —CH); 4.48 μ (—C≡N); 6.09 μ (terminal C=C); 6.31 μ, 6.50 μ, 6.62 μ (C=C, C=N, and/or —NH); 10.12 μ, 10.88 μ (—CH=CH$_2$).
UV $\lambda_{max}^{EtOH}$: 347 mμ (ε = 5000); 297 mμ (ε = 22,800).
NMR (CDCl$_3$): multiplet, 4.23 δ (2H, allylic methylene); multiplet 5.3 δ (2H, terminal olefinic); multiplet, 5.9 δ (1H, internal olefinic); broad singlet, 6.5 δ (1H, N—H).
Anal. Calcd for C$_8$H$_6$N$_5$Cl:
  C, 49.20; H, 2.73; N, 31.89; Cl, 16.17
Found: C, 48.96; H, 2.88; N, 31.78; Cl, 15.92.

EXAMPLE A

Fluorescing Agents

Each of the amino-substituted pyrazines of this invention fluoresce when a tetrahydrofuran solution of the compound is irradiated with ultraviolet light.

An additional test for fluorescent brighteners was carried out as follows. A solution of 50 mg of the test compound dissolved in 2 ml of acetone was added all at once with stirring to 125 ml of hot (130°F) water. A 5-g sample of a multifabric swatch was immersed in the solution and it was heated at 100°C for 1 hour with occasional swirling. The swatch was removed, rinsed well with distilled water and air-dried. The dried swatch was examined under an ultraviolet light using an untreated swatch as a control.

2-Amino-3-chloro-5,6-dicyanopyrazine - blue fluorescence was exhibited by the acetate, nylon, Arnel, and Verel T5 portions of the swatch, which showed incorporation of the compound.

2-Allylamino-3-chloro-5,6-dicyanopyrazine — similar blue fluorescence was exhibited by the acetate, nylon, Arnel, and Verel T5 portions of the swatch also showing incorporation of the compound.

When 2,3-dichloro-5,6-dicyanopyrazine is reacted as disclosed herein with the amines shown in Column A of Table I, the corresponding 2-substituted-amino-3-chloro-5,6-dicyanopyrazines shown in Column B of the Table are obtained.

TABLE I

| A | B |
|---|---|
| C$_2$H$_5$NH$_2$ | 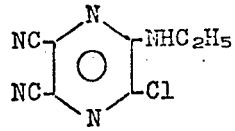 |
| C$_4$H$_9$NH$_2$ | 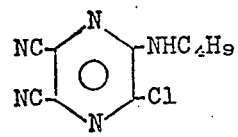 |
| (CH$_3$)$_2$CHNH$_2$ | 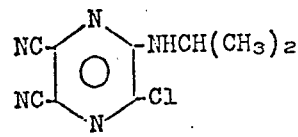 |
| (CH$_3$)$_3$CNH$_2$ | 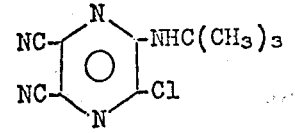 |
| (CH$_3$)$_2$CHNHCH$_3$ | 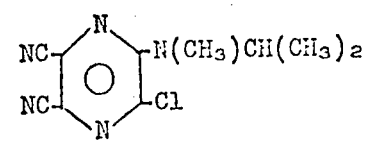 |
| n-C$_5$H$_{11}$NH$_2$ | 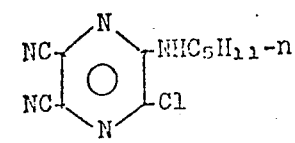 |
| C$_3$H$_7$CH(CH$_3$)NH$_2$ | 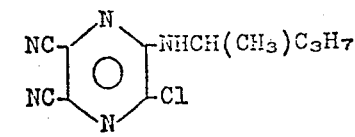 |

TABLE I (continued)

| A | B |
|---|---|
| n-C$_6$H$_{13}$NH$_2$ | 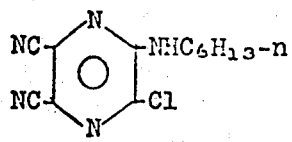 |
| C$_4$H$_9$NHC$_2$H$_5$ | 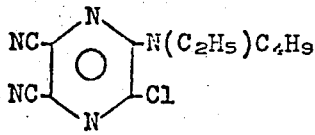 |
| (C$_6$H$_{13}$)$_2$NH | 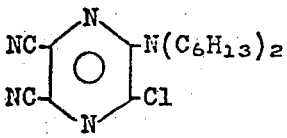 |
| C$_4$H$_9$NHC$_3$H$_7$ | 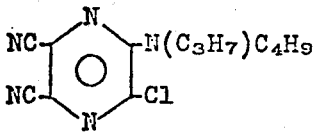 |
| (CH$_2$=CHCH$_2$)$_2$NH | 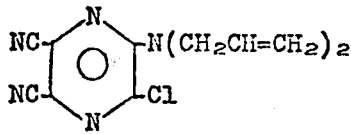 |
| CH$_3$CH=CHCH$_2$NHCH$_3$ | 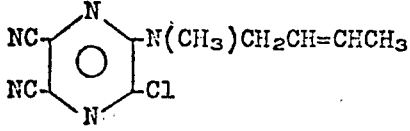 |

I claim:

The embodiments of the invention in which an exclusive property or privilege is claimed are defined as follows:

1. A compound of the formula

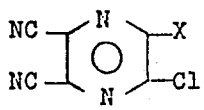

wherein
X is NH$_2$, NHR or NRR' in which R and R' individually are alkyl of 1–6 carbon atoms or alkenyl of 3 to 6 carbon atoms with the proviso that an unsaturated carbon of the alkenyl group is not directly attached to nitrogen.

2. A compound according to claim 1 where $X$ = NH$_2$; 2-amino-3-chloro-5,6-dicyanopyrazine.

3. A compound according to claim 1 where $X$ = NH—CH$_2$CH=CH$_2$; 2-allylamino-3-chloro-5,6-dicyanopyrazine.

* * * * *